US006845160B1

(12) United States Patent
Aoki (10) Patent No.: US 6,845,160 B1
(45) Date of Patent: Jan. 18, 2005

(54) APPARATUS AND METHOD FOR DEPOSITING ENCRYPTION KEYS

(75) Inventor: Ryuichi Aoki, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/415,461

(22) Filed: Oct. 14, 1999

(30) Foreign Application Priority Data

Nov. 12, 1998 (JP) .......................................... 10-321867

(51) Int. Cl.[7] .............................................. H04L 9/00
(52) U.S. Cl. ...................... 380/286; 380/279; 380/281; 380/282; 380/284
(58) Field of Search ................................ 380/279, 281, 380/282, 284, 286

(56) References Cited

U.S. PATENT DOCUMENTS

| | | | | |
|---|---|---|---|---|
| 5,436,972 A | * | 7/1995 | Fischer ....................... | 380/286 |
| 5,721,777 A | * | 2/1998 | Blaze ........................... | 380/4 |
| 6,282,295 B1 | * | 8/2001 | Young et al. ............... | 380/286 |
| 6,549,626 B1 | * | 4/2003 | Al-Salqan ................... | 380/286 |

FOREIGN PATENT DOCUMENTS

| JP | A-11-15373 | 1/1999 |
|---|---|---|

OTHER PUBLICATIONS

Denning, Dorothy: "Descriptions of Key Escrow Systems" Communications of the ACM, Feb. 26, 1997.*
Young, Adam, Yung, Moti: "Auto-Recoverable Auto-Certifiable Cryptosystems" Advances in Cryptography-Eurpcrypt '98, LNCS 1403, pp. 17–31, 1998.*
Fouque, Pierre-Alain, et al: "Recovering Keys in Open Networks" IEEE 1999.*
Al-Salqan, Yahya: "Cryptographic Key Recovery" IEEE 1997.*

* cited by examiner

Primary Examiner—Andrew Caldwell
Assistant Examiner—Paul Callahan
(74) Attorney, Agent, or Firm—Oliff & Berridge, PLC (57) ABSTRACT

An encryption key depositing apparatus comprising a unit that generates an encryption key for a user; and a unit that starts a process in response to the generation of the encryption key, the process allowing a depositary deposited with the generated encryption key to store the key in question in a subsequently recoverable manner.

28 Claims, 8 Drawing Sheets

APPARATUS AND METHOD FOR DEPOSITING ENCRYPTION KEYS

BACKGROUND OF THE INVENTION

1. Field of the Invention

The present invention relates to an apparatus and a method for depositing encryption keys such as private keys of a public key cryptosystem with depositaries.

2. Description of the Related Art

Confidentiality of information is ensured illustratively by encrypting it with a public key cryptosystem. Such encrypted information cannot be decrypted without recourse to suitable private keys. Where general security of an individual is concerned, no encrypted information belonging to that individual can be decrypted by use of a private key if the individual is for some reason unable to access the system (due to absence, illness, death, etc.). Since the inability to access the system obviously means that any access to the information therein is denied, it no longer matters whether the individual can use his or her private key. Because the information belongs to the individual who owns the private key, there is no need in such a case to make arrangements for any other individual to gain access to the information.

Things are different where corporate security is involved. The unavailability of a private key to any party other than the individual who owns it can be a problem. Individuals working for a company play their respective roles in the organization's activities. Information about corporate activities is necessary for the firm whether or not any such information is encrypted by private keys belonging to specific workers. If encrypted corporate information cannot be decrypted when needed because an individual worker with a private key to the information is out of office, on sick leave or has deceased, an appropriate in-house proxy must be allowed to access the information so that business will proceed unimpaired.

Mechanisms for depositing private keys with depositaries have existed but they have posed the following problems:

1) Whether or not to deposit private keys with depositaries is left to the discretion of the owners of the keys. Of course, rules could be established to stipulate the deposition of private keys, but there is no guarantee that such rules are strictly observed throughout a system. Nor is there any way of verifying whether deposited private keys are legitimate keys.

2) Selection of depositaries is at the discretion of private key owners. Unless a private key is deposited with a competent depositary, the deposited key is unavailable in case of an emergency. A malicious depositary can abuse the entrusted private key.

3) Procedures of deposition are complicated. Generally, an original private key is divided into a plurality of parts that are stored on a plurality of portable storage media such as floppy disks. The storage media are then deposited with a plurality of depositaries. The procedures are troublesome to both the key owner and the depositaries.

4) Management of entrusted private key parts is left to the discretion of depositaries. Inadequate management by the depositaries can lead to the abuse of a key by an unscrupulous third party.

5) The depositaries designated by a private key owner can conspire to restore and use or abuse the private key without knowledge of the owner. The right of the legitimate key owner can thus be infringed on, and the security of electronic signatures can be compromised.

6) Once a private key is reconstituted, the party or parties that restored the key will permanently possess the same right of access as the original private key owner. This will result in an infringement of the right of the legitimate key owner and compromise the security of electronic signatures.

It is therefore an object of the present invention to overcome the above and other deficiencies of the prior art and to provide an apparatus and a method for implementing a systematically controlled scheme of depositing private keys with depositaries and of sufficiently guaranteeing the security of entrusted private keys.

SUMMARY OF THE INVENTION

The present invention envisages having encryption keys such as private keys deposited with depositaries in the following manner:

(1) A mechanism is to be established whereby each private key is deposited automatically at the same time that the private key in question and a public key paired therewith are generated.

(2) Rules are to be established whereby depositaries of a given private key are automatically selected.

(3) A mechanism is to be established for the management of deposited keys, wherein the entrusted keys are in protected by private keys of depositaries.

(4) Collaborating depositaries may perform only the process requiring the private key they are entrusted with; they cannot acquire the original private key in conspiracy.

(5) There should be a limited period in which to perform the process requiring an original private key.

(6) The process requiring an original private key is limited to the decryption of information that has been encrypted using the private key in question.

In achieving the foregoing and other objects of the present invention and according to one aspect thereof, there is provided an encryption key depositing apparatus comprising: a unit that generates an encryption key for a user; and a unit that starts a process in response to the generation of the encryption key, the process allowing a depositary deposited with the generated encryption key to store the key in a subsequently recoverable manner.

The structure above controls the deposition of encryption keys in such a manner that the keys are deposited in compliance with system requirements and in a way sufficient to maintain the security of the deposited keys. A selected class of encryption keys instead of all of them may be deposited in the suitably controlled manner. Illustratively, encryption keys may be private keys of a public key cryptosystem. Of course, encryption keys of a routine encryption key system may be deposited.

In a preferred structure according to the present invention, rules may be established to form a basis for determining depositaries. Encryption keys may then be stored in accordance with the established rules.

In another preferred structure according to the present invention, the encryption key depositing apparatus may be implemented as a client-server system wherein recovery information for recovering an encryption key is encrypted by a public key of a depositary and retained in the server. In a further preferred structure according to the present invention, the server, in response to a recovery request from the depositary, may send to the depositary the recovery information encrypted by the public key of the depositary; wherein the server acquires from the depositary the recovery information decrypted by a private key of the depositary and then encrypted by a public key of the server; wherein the acquired encrypted recovery information is decrypted by use of a private key of the server, the decrypted recovery information being used together with the private key of the server regarding the depositary to decrypt the recovery tri information about the encryption key; and wherein the tin decrypted recovery information is used to recover the encryption key. The server may illustratively log historical records of such recovery requests.

In an even further preferred structure according to the present invention, the server, in response to an encryption key acquisition request from the depositary, may encrypt the recovered encryption key using the public key of the depositary and send the encrypted recovered encryption key to the depositary. The server may illustratively log historical records of such encryption key acquisition requests.

In a still further preferred structure according to the present invention, the server may not send the recovered encryption key to the depositary and may perform on behalf of the depositary a process using the encryption key in response to a processing request from the depositary. The server may illustratively log historical records of such processing requests from the depositary.

Preferably, the historical records may be supplied to the user who owns the encryption key.

It is obvious that the present invention may also be implemented in the form of an encryption key depositing method as well as a computer program product comprising such a method in a manner executable by a computer system.

Other objects, features and advantages of the present invention will become more apparent upon a reading of the following description and appended drawings.

DESCRIPTION OF THE PREFERRED EMBODIMENTS

Preferred embodiments of the present invention will now be described in detail with reference to the accompanying drawings.

(1) Selection of Private Key Depositaries (by Use of a Group Hierarchy)

With respect to automated deposition of private keys, the present invention envisages using encryption techniques to prevent illegal access requests from getting fulfilled. However, there are techniques that do not involve encryption in achieving the same objective.

A first process to be carried out is the selection of depositaries. The depositary refers to an entity with which a private key of an individual is deposited. More specifically, depositaries signify individuals or groups (including assigned roles constituting a group, as has been the case so far) that possess the right to acquire or use private keys they are deposited with. When a group is selected as a depositary for an individual's private key, members making up the group have the right to acquire or use the private key in question.

Typical ways to select depositaries are as follows:
1) Rules are established according to which the entire group hierarchy selects depositaries. For example, an individual belonging to a group may have as depositaries both the person in charge of the group in question and the person in charge of the immediately higher group in the hierarchy, or the person in charge of the group in question and the group in question.
2) Rules are established according to which each group selects its own depositaries.
3) Individual private key owners designate suitable depositaries at their discretion.

If a plurality of depositaries are designated by an individual, it is necessary to specify how many of them need to get together to authorize the right to use the private key deposited by the individual. The number of depositaries thus specified is called a necessary depositary count.

(2) Selection of Private Key Depositaries (by Declaration)

The group hierarchy may not be used in designating depositaries. In such a case, individuals designate appropriate depositaries freely or according to predetermined rules. The designated depositaries are reported to other parties either to gain permission or for compliance checks on depositary designation. The necessary depositary count is specified in the same manner as when the group hierarchy is utilized.

(3) Automatic Deposition of Private Keys

A deposited private key of an individual is encrypted by a public key of a depositary, and the encrypted private key is retained illustratively by a so-called service provider. If there are two or more depositaries for each private key, the deposited private key is divided and the divided parts are each encrypted by a public key. There are known methods for dividing a private key. One such method involves dividing the original private key into three equal parts (called Xp1, Xp2 and Xp3) if there are three depositaries and if the necessary depositary count is two. Three key-part combinations, Xp1 and Xp2, Xp1 and Xp3, and Xp2 and Xp3, are formed and distributed to the three depositaries. Any two of the three depositaries may reconstitute the original private key when bringing together their deposited key parts.

The deposited private key, owned by an individual, is divided as needed by the owner's client and encrypted thereby using public keys corresponding to the depositaries. The divided key parts are further encrypted by the service provider using public keys. The divided key parts thus encrypted are either retained by the service provider or sent to the depositaries.

(4) Management of Deposited Private Keys

The deposited private keys are encrypted by the depositaries' public keys and managed by the depositaries or by the server.

(5) Acquisition of Deposited Private Keys

Individual depositaries or members of a group depositary may designate a deposited private key and request its use. The designated private key is then decrypted and made available from storage to the requesting depositaries. Alternatively, not the private key itself but the right to use the key in question may be granted. The way in which to provide the right to use the key will be described later.

An original private key is reconstituted (in part or in its entirety) by bringing together the necessary number of encrypted parts of the deposited key from storage. The reconstitution of the private key is carried out either by way of the service provider or between the individual depositaries involved.

(6) Acquisition of the Right to Use Deposited Private Keys

Once a private key itself is acquired by depositaries, the key is used freely by these persons or entities. This will compromise the restricted use of private keys by others, which may jeopardize the legitimacy of the public key cryptosystem itself. To prevent such an eventuality, depositaries are barred from acquiring the deposited private key itself and instead allowed only to use it. Specifically, the reconstituted deposited private key is permitted to exist only in the service provider or in the client system. The service provider performs a decrypting process using the private key on behalf of the depositaries.

(7) Preservation of Logs of Used Deposited Private Keys and Subsequent Reporting of Such Key Use Logs If a scheme is instituted whereby the right to use deposited private keys is granted by way of the service provider, the service provider keeps logs of decrypting processes it carried out and subsequently reports the logs to the owners of the deposited private keys. The logs contain names of those who requested the uses of private keys, times of day at which the requests were made, target processes (generally decrypting processes only), and target information to be accessed. The reporting is done preferably by electronic mail. It is also preferred that the logs be reported not only to the private key owners themselves but also to the person in charge of the immediately higher group (i.e., superior) Such measures are effective in preventing access irregularities and discouraging inadvertent acquisition of the right to use deposited private keys.

Below is a description of how this invention is typically embodied.

In the description that follows, specific terms are assigned the following meanings:

[Terms]

target private key: a deposited private key private key owner: an individual who owns a private key depositary: an individual with whom a target private key is deposited deposited private key: information actually sent to a depositary and needed to reconstitute a target private key depositary count: the number of depositaries allocated to a single target private key necessary depositary count: the necessary number of depositaries whose deposited private keys are brought together to reconstitute a target private key.

Figure 1:
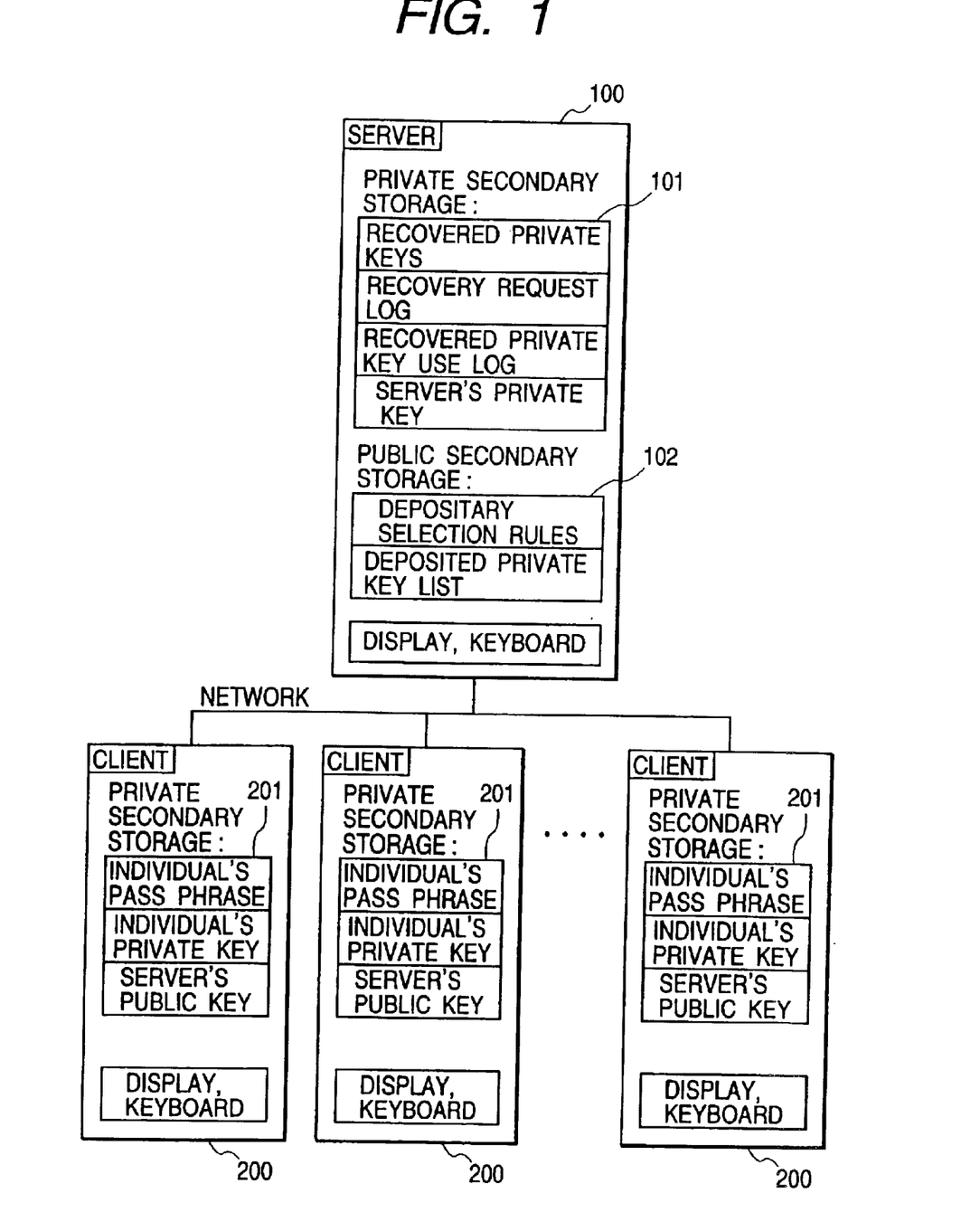
FIG. 1 is a block diagram showing an overall constitution of an embodiment of the present invention.

FIG. 1 is a block diagram showing an overall constitution of the embodiment. In FIG. 1, a server 100 and a plurality of clients 200 are interconnected over a network 300. The network 300 links systems together in the entire corporation and is made up of LANs or LAN segments connected by WAN. The server 100 and clients 200 possess common computer system resources and are configured in a known manner. The configuration of this client-server system is thus of common nature and will not be discussed further. The server 100 has a private secondary storage 101 and a public secondary storage 102, whereas the clients 200 have a private secondary storage 201 each. Information in the private secondary storages 101 and 201 cannot be referenced directly by external entities. Information in the public secondary storage 102 may be accessed freely by external entities but may not be modified thereby.

The private secondary storage 101 of the server 100 includes the server's private keys, recovered private keys, a recovery request log, and a recovered private key use log. The public secondary storage 102 of the server 100 comprises depositary selection rules and a deposited private key list. The private secondary storage 201 of each client 200 contains an individual's pass phrase, an individual's private key, and the server's public key.

In the setup of FIG. 1, the server 100 manages deposited private keys, performs the process of recovering private keys, and logs historical records. Alternatively, these processes may be carried out only by the clients 200.

Figure 2:
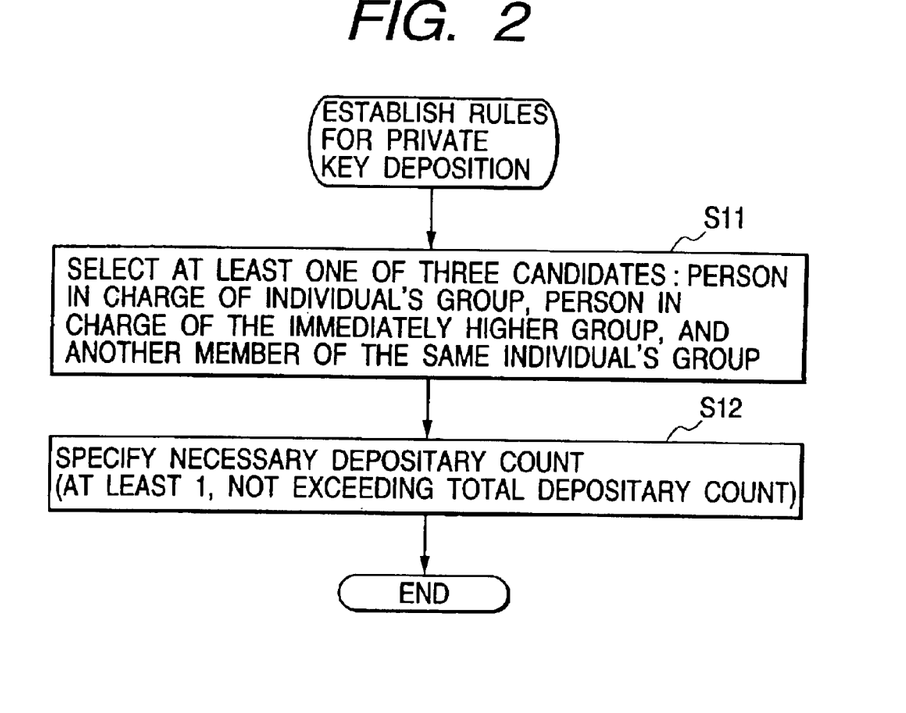
FIG. 2 is a flowchart of steps constituting a process of the embodiment for establishing rules for depositing private keys.

The embodiment performs the following processes:

(1) Process of Establishing Rules for Private Key Deposition (See FIG. 2)

This process is performed by the client 200 of an individual in charge of supervising other individuals. Depositaries are controlled in accordance with the established rules. Instead of depositaries being determined according to the private key deposition rules established by this process, the depositaries may alternatively be selected by a first process of voluntarily determining private key depositaries (FIG. 3) or by a second process of voluntarily determining private key depositaries (FIG. 4). Which process to adopt depends on the system requirements.

The process of establishing rules for private key deposition is carried out as follows:

[Step S11] At least one of three candidates is selected: the person in charge of the individual's group, the person in charge of the immediately higher group, and another member of the same individual's group.

[Step S12] The necessary depositary count is specified (at least one and not exceeding the total depositary count).

The rules above are observed in determining the depositaries. Where necessary, the user may make a supplementary choice.

Figure 3:
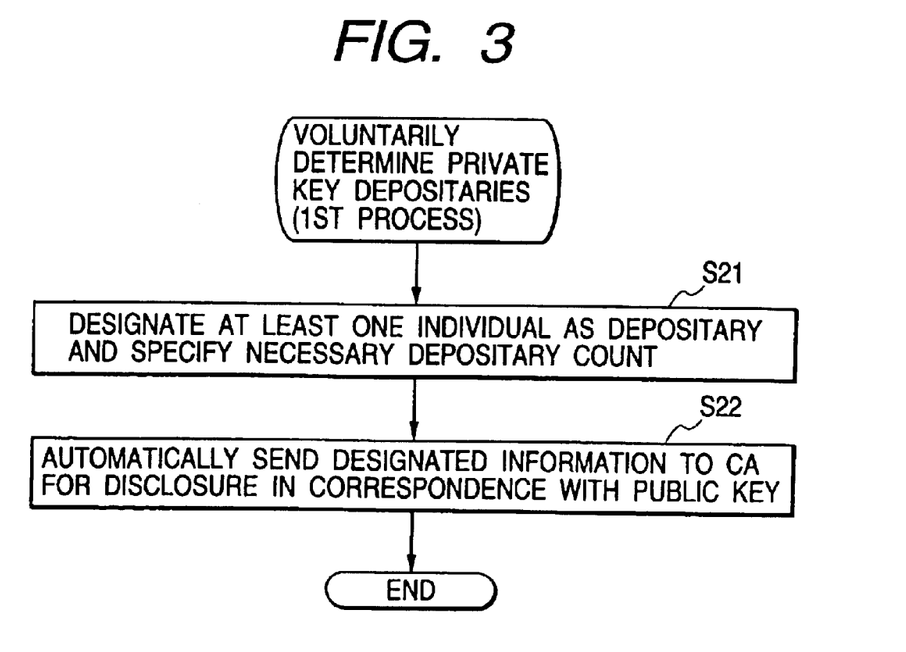
FIG. 3 is a flowchart of steps constituting a first process of the embodiment for voluntarily determining private key depositaries.
Figure 4:
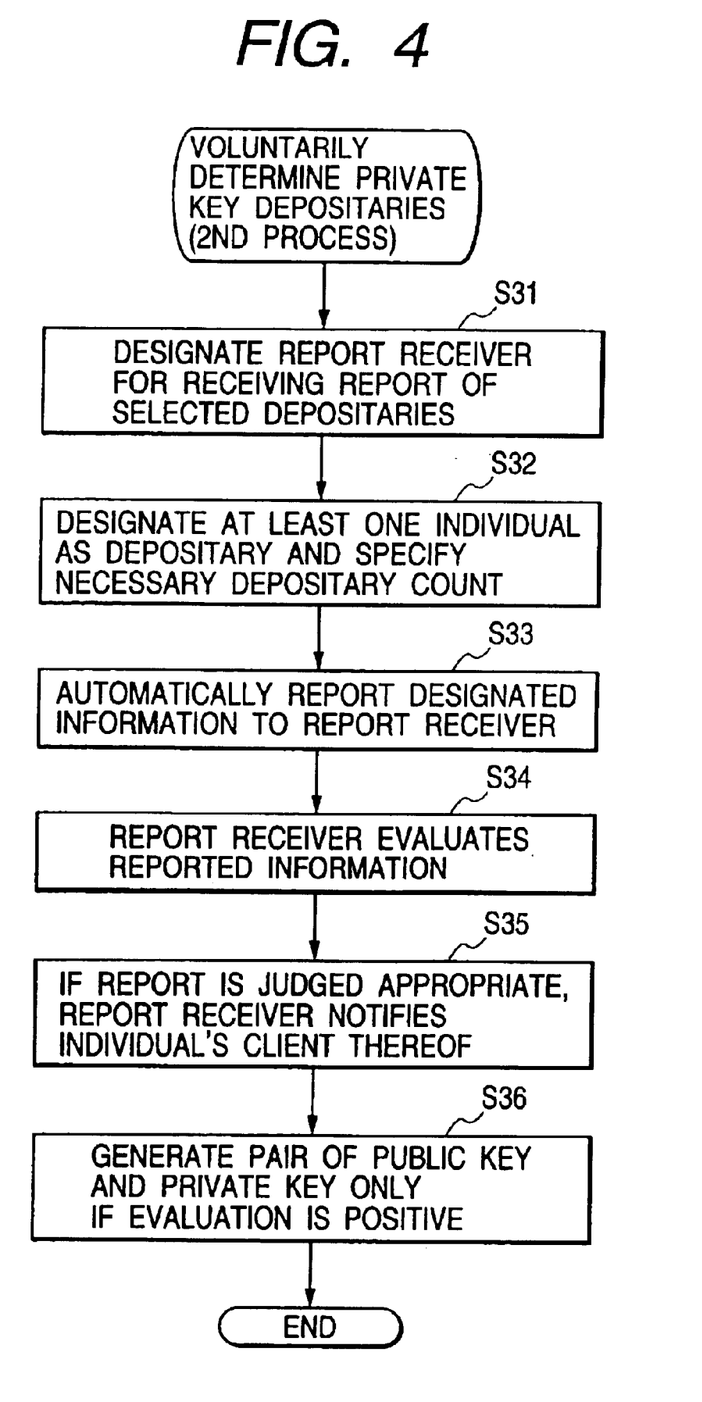
FIG. 4 is a flowchart of steps constituting a second process of the embodiment for voluntarily determining private key depositaries.

(2) First Process of Voluntarily Determining Private Key Depositaries (See FIG. 3)

This process is performed by each individual's client 200. If this process is selected, there is no need to retain rules for depositary selection in the server 100 of FIG. 1. Instead, a suitable CA (certificate authority) should be established and supplied with items indicating depositaries in correspondence with public keys. The CA, not shown in FIG. 1, is an ordinary service provider in effect when a public key cryptosystem is employed.

The first process of voluntarily determining private key depositaries is carried out as follows:

[Step S21] At least one individual is designated as a depositary, and a necessary depositary count is specified.

[Step S22] The designated information is automatically sent to the CA to establish correspondence with a public key.

(3) Second Process of Voluntarily Determining Private Key Depositaries (See FIG. 4)

This process is performed by each individual's client 200. If this process is selected, there is no need to retain rules for depositary selection in the server 100 of FIG. 1. Instead, each client 200 must have an area, not shown, for accommodating information indicating that a designated receiver having received a report of the selected depositaries has approved the choice as appropriate.

The second process of voluntarily determining private key depositaries is carried out as follows:

[Step S31] A report receiver for receiving a report of selected depositaries is designated.

[Step S32] At least one individual is designated as a depositary and a necessary depositary count is specified.

[Step S33] The designated information is reported automatically to the report receiver.

[Step S34] The report receiver evaluates the reported information.

[Step S35] If the report is judged appropriate upon evaluation, the individual's client 200 that originated the report is notified thereof.

[Step S36] A pair of a public key and a private key is generated only if the evaluation is positive.

Figure 5:
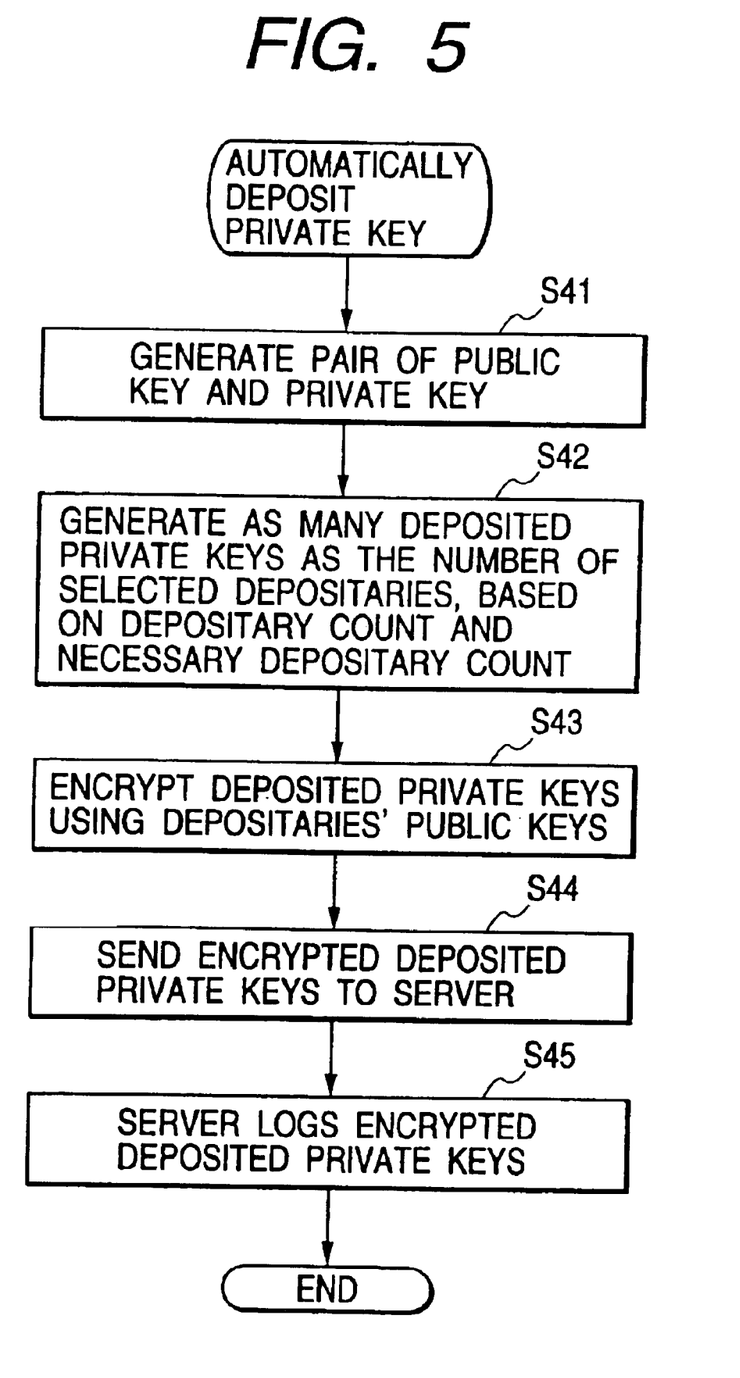
FIG. 5 is a flowchart of steps constituting a process of the embodiment for automatically depositing private keys.

(4) Process of Automatically Depositing Private Keys (See FIG. 5)

This process is performed following the generation of a pair of a public key and a private key by a client 200. Prior to this process, one of three processes above must be carried out: the process of establishing rules for private key deposition (FIG. 2), the first process of voluntarily determining private key depositaries (FIG. 3), or the second process of voluntarily determining private key depositaries (FIG. 4).

The process of automatically depositing private keys is conducted as follows:

[Step S41] A pair of a public key and a private key is generated.

[Step S42] As many deposited private keys as the number of selected depositaries are generated, based on the depositary count and the necessary depositary count.

[Step S43] The deposited private keys are encrypted by use of the depositaries' public keys.

[Step S44] The encrypted deposited private keys are sent to the server 100.

[Step S45] The server 100 records the encrypted deposited private keys.

Figure 6:
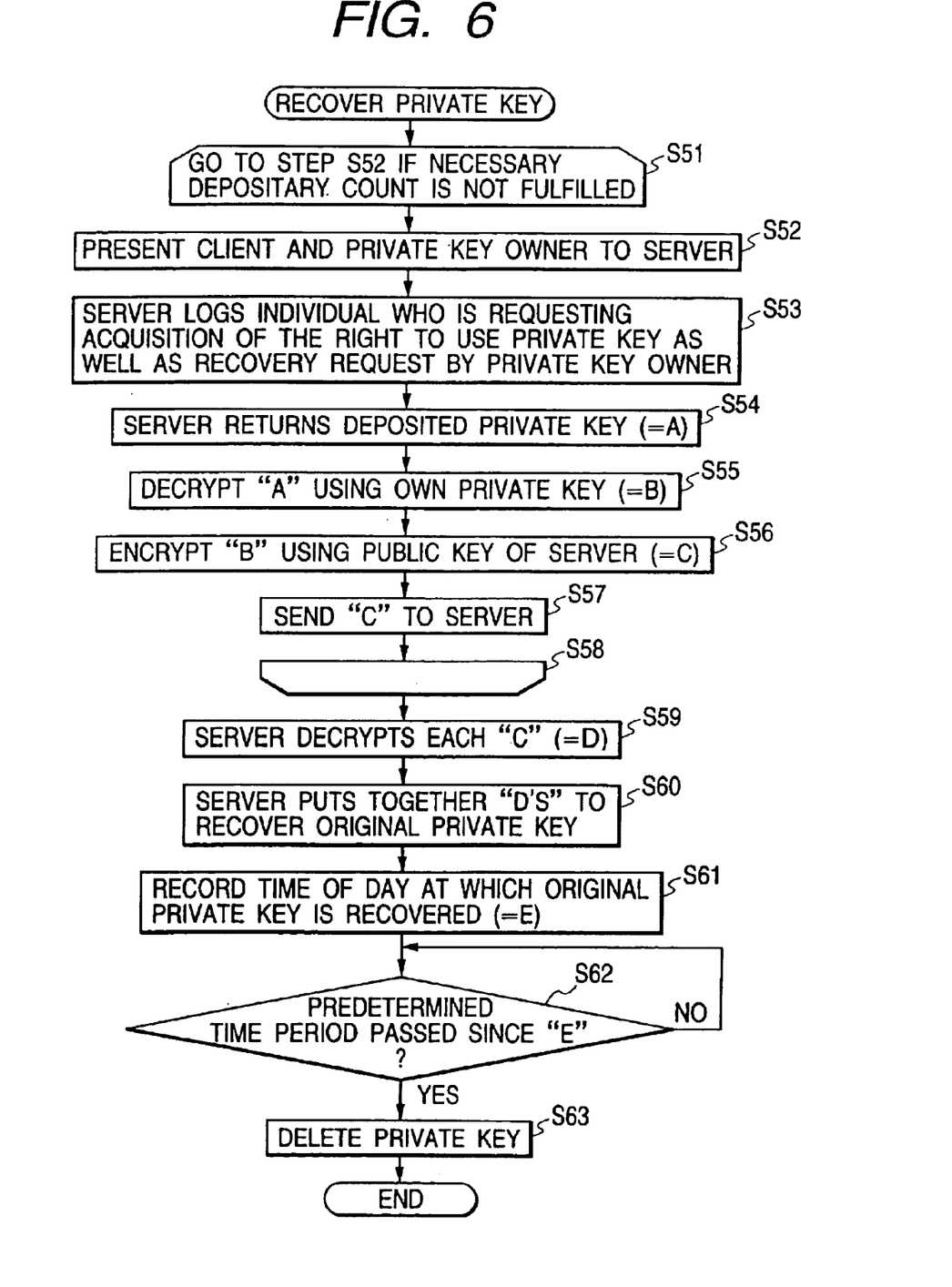
FIG. 6 is a flowchart of steps constituting a process of the embodiment for recovering private keys.

(5) Process of Recovering Private Keys (See FIG. 6)

This process is performed by the clients 200 of as many individuals as the necessary depositary count, i.e., the necessary number of depositaries whose deposited private keys are to be brought together to reconstitute a target private key. The process of recovering a private key is carried out as follows:

[Step S51] Steps up to step S57 are repeated until the necessary depositary count is fulfilled.

[Step S52] A client 200 presents itself and the private key owner to the server 100.

[Step S53] The server 100 logs the individual who is requesting acquisition of the right to use the private key as well as the recovery request by the private key owner.

[Step S54] The server 100 returns the deposited private key.

[Step S55] The client 200 decrypts the returned deposited private key using its own private key.

[Step S56] The client 200 encrypts the decrypted deposited private key using a public key of the server 100.

[Step S57] The deposited private key encrypted by the public key of the server 100 is returned to the server 100.

[Step S58] Step S59 is reached if the necessary depositary count is fulfilled.

[Step S59] Using its private key, the server 100 decrypts the deposited private key that was sent from each depositary after being encrypted by the public key of the server 100.

[Step S60] The server 100 puts together the decrypted deposited private keys to recover the original private key.

[Step S61] The server 100 records the time of day at which the original private key is recovered.

[Step S62] Upon elapse of a predetermined time period following the time of day at which the private key was recovered, step S63 is reached.

[Step S63] Upon elapse of the predetermined time period, the private key is deleted.

Figure 7:
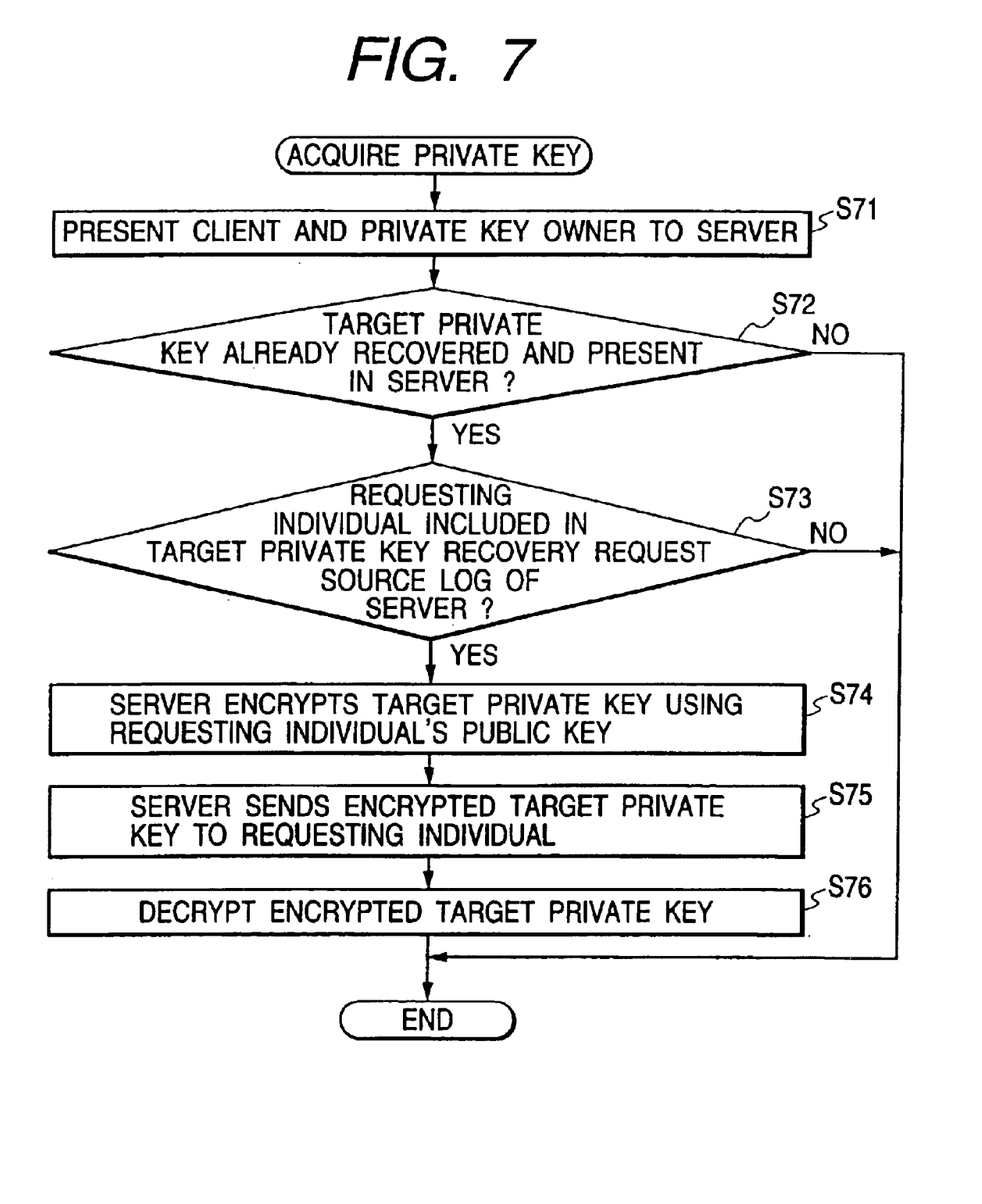
FIG. 7 is a flowchart of steps constituting a process of the embodiment for acquiring private keys.

(6) Process of Acquiring Private Keys (See FIG. 7)

This process is initiated by an individual depositary wishing to acquire a recovered private key itself. Skipping this process and offering instead a process of only using private keys (FIG. 8) is more effective in preventing illegal use of the private keys and maintaining their reliability.

The process of acquiring private keys is carried out as follows:

[Step S71] The client 200 presents itself and the private key owner to the server 100.

[Step S72] The server 100 checks to see if the target private key is already recovered and present in the server. If the target private key is absent, the process is terminated. If the target key is found to exist, step S73 is reached.

[Step S73] The server 100 checks to see if the individual who is requesting acquisition of the private key is included in a target private key recovery request source log. If the requesting individual is not included in the log, the process is terminated. If the individual is found to be included in the log, step S74 is reached.

[Step S74] The server 100 encrypts the target private key using the requesting individual's public key.

[Step S75] The server 100 sends the encrypted target private key to the requesting individual.

[Step S76] The client 200 decrypts the encrypted target private key received by use of the requesting individual's private key.

Figure 8:
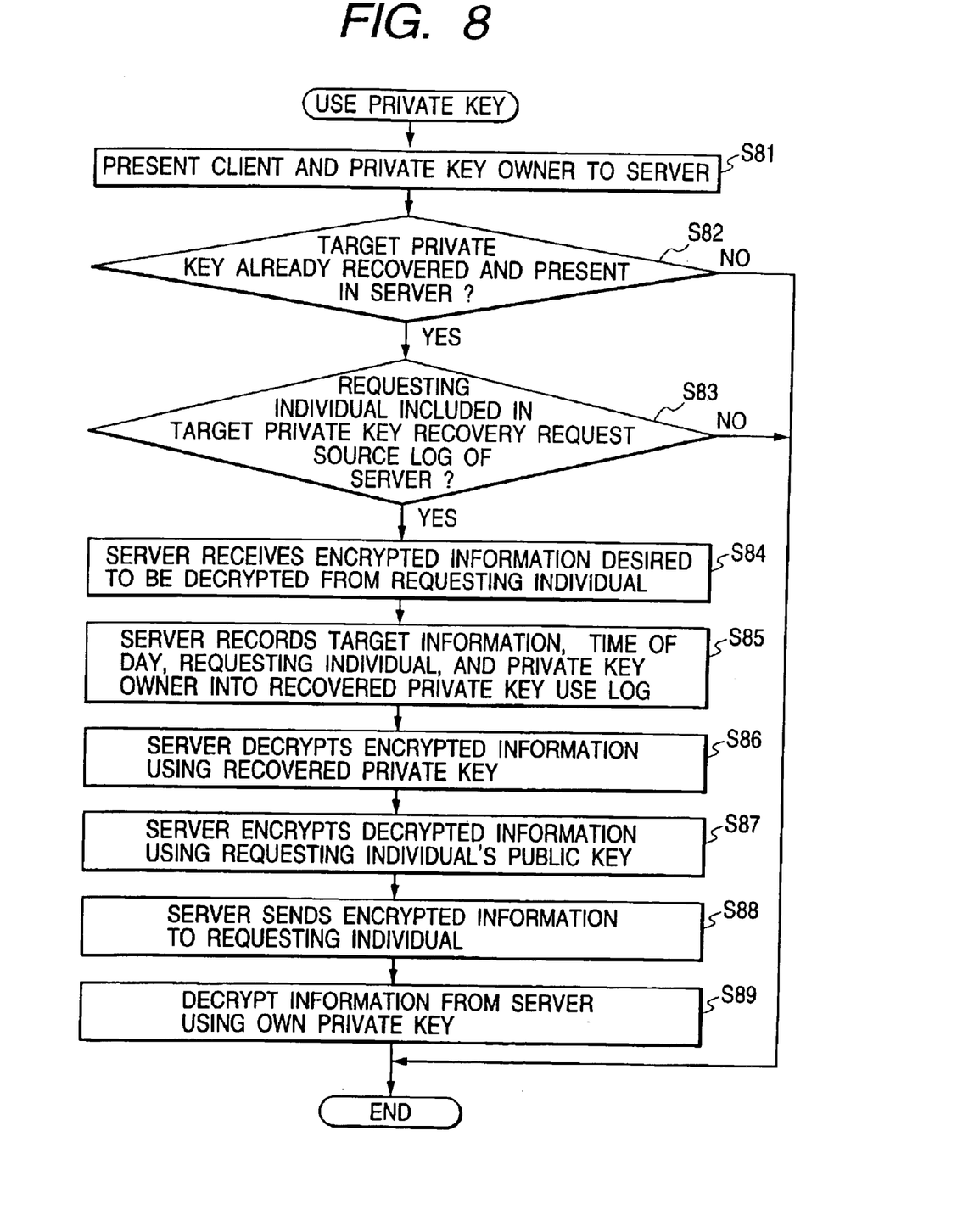
FIG. 8 is a flowchart of steps constituting a process of the embodiment for using private keys.

(7) Process of Using Private Keys (See FIG. 8)

This process is initiated by an individual depositary wishing to use a private key. The process illustrates a typical case permitting only the decryption of target information involving a specific private key.

The process of using a private key is carried out as follows:

[Step S81] The client 200 presents itself and the private key owner to the server 100.

[Step S82] The server 100 checks to see whether the target private key is already recovered and present in the server 100. If the target private key is absent, the process is terminated. If the target key is found to exist, step S83 is reached.

[Step S83] The server 100 checks to see whether the individual who is requesting use of the private key is included in the target private key recovery request source log. If the requesting individual is not included in the log, the process is terminated. If the individual is found to be included in the log, step S84 is reached.

[Step S84] The server 100 receives from the requesting individual the encrypted information desired to be decrypted.

[Step S85] The server 100 records into a recovered private key use log the target information to be decrypted, the time of day at which the decrypting request is issued, the requesting individual, and the private key owner.

[Step S86] The server 100 decrypts the encrypted information using the recovered private key.

[Step S87] The server 100 encrypts the decrypted information using the requesting individual's public key.

[Step S88] The server 100 sends the encrypted information to the requesting individual.

[Step S89] At the client 200, the requesting individual decrypts the information from the server using his or her own private key.

Figure 9:
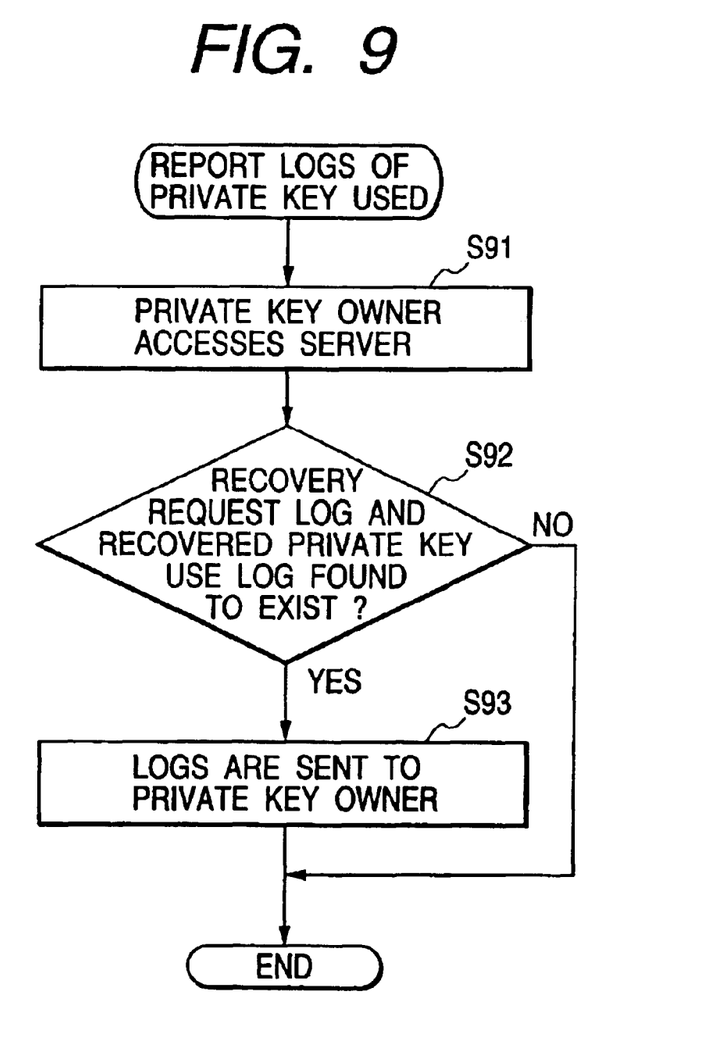
FIG. 9 is a flowchart of steps constituting a process of the embodiment for reporting logs of private key use.

(8) Process of Reporting Logs of Private Key Uses (See FIG. 9)

This process involves making a subsequent report of recoveries and uses of a private key to its owner. The process is effected automatically when the private key owner gains access to the server 100 for any reason. The process of reporting logs of private key uses is carried out as follows:

[Step S91] At the client 200, the private key owner accesses the server 100.

[Step S92] The server 100 checks to see whether there exist a recovery request log and a recovered private key use log regarding the private key owner who has accessed the server 100. If no such logs exist, the process is terminated. If the logs are found to exist, step S93 is reached.

[Step S93] The server 100 sends the recovery request log and recovered private key use log to the private key owner.

As described and according to the present invention, a scheme is instituted whereby the deposition of encryption keys is controlled so that the keys are regularly deposited and that the security of the is deposited keys is sufficiently guaranteed.

As many apparently different embodiments of the present invention may be made without departing from the spirit and scope thereof, it is to be understood that the present invention is not limited to the specific embodiments thereof except as defined in the appended claims.

What is claimed is:

1. An encryption key depositing apparatus, comprising:
a unit that generates an encryption key for a user;
a unit that starts a process in response to the generation of said encryption key, said process allowing a depositary, with which said generated encryption key was deposited, to store said key in a subsequently recoverable manner; and
a server and a plurality of clients, wherein recovery information, usable to recover said encryption key, is encrypted by a public key of said depositary and is retained in said server,
wherein said server, in response to a recovery request from the depositary, sends to said depositary said recovery information encrypted by said public key of said depositary, and acquires from said depositary said recovery information decrypted by a private key of said depositary and then encrypted by a public key of said server.

2. The encryption key depositing apparatus according to claim 1, wherein said encryption key is a private key of a public key cryptosystem.

3. The encryption key depositing apparatus according to claim 1, further having rules established as a basis for determining said depositary, said encryption key being stored in accordance with said rules.

4. The encryption key depositing apparatus according to claim 1,
wherein said server decrypts the acquired encrypted recovery information using a private key of said server; and
wherein the server recovers said encryption key using the decrypted acquired recovery information.

5. The encryption key depositing apparatus according to claim 1, wherein said server logs historical records of the recovery request.

6. The encryption key depositing apparatus according to claim 4, wherein said server, in response to an encryption key acquisition request from said depositary, encrypts said recovered encryption key using said public key of said depositary and sends said encrypted recovered encryption key to said depositary.

7. The encryption key depositing apparatus according to claim 6, wherein said server logs historical records of the encryption key acquisition request.

8. The encryption key depositing apparatus according to claim 4, wherein said server performs on behalf of said depositary a process using said encryption key in response to a processing request from said depositary.

9. The encryption key depositing apparatus according to claim 8, wherein said server logs historical records of the processing request from said depositary.

10. The encryption key depositing apparatus according to claim 5, wherein said historical records are supplied to the user to whom said encryption key is assigned.

11. A method for depositing an encryption key, comprising:
generating an encryption key for a user;
starting a process in response to generating said encryption key, said process allowing a depositary, with which the generated encryption key was deposited, to store said key in a subsequently recoverable manner;
encrypting recovery information using a public key of the depositary, the recovery information usable to recover the encryption key;
sending the encrypted recovery information to the depositary in response to a recovery request from the depositary; and
acquiring from the depositary the recovery information decrypted by a private key of the depositary and then encrypted by a public key.

12. A computer storage medium having executable software code, the executable software code:
instructions for generating an encryption key for a user;
instructions for starting a process in response to generating said encryption key, said process allowing a depositary, with which the generated encryption key was deposited, to store the key in a subsequently recoverable manner;
instructions for encrypting recovery information using a public key of the depositary, the recovery information usable to recover the encryption key;
instructions for sending the encrypted recovery information to the depositary in response to a recovery request from the depositary; and
instructions for acquiring from the depositary the recovery information decrypted by a private key of the depositary and then encrypted by a public key.

13. The encryption key depositary apparatus according to claim 4, wherein the server logs the depositary on historical records of depositaries,
wherein, in response to an acquisition request from the depositary, the server determines whether the depositary is logged on the historical records of depositaries, and, if so, the server encrypts the recovered encryption key using the public key of the depositary and sends the encrypted recovered encryption key to the depositary.

14. An encryption key recovering method, comprising:
receiving recovery request from a depositary for recovering an encryption key, the encryption key associated with recovery information, the recovery information encrypted with a public key of the depositary and retained at the server;
sending the encrypted recovery information to the depositary; and
acquiring from the depositary the encrypted recovery information that is decrypted by a private key of the depositary and then encrypted by a public key of the server.

15. The method of claim 11, further comprising:
decrypting the acquired encrypted recovery information using a private key of said server, and
recovering said encryption key using the decrypted acquired recovery information.

16. The method of claim 11, further comprising:
logging historical records of the recovery request.

17. The method of claim 15, further comprising:
encrypting said recovered encryption key using said public key of said depositary in response to an encryption key acquisition request from said depositary, and
sending said encrypted recovered encryption key to said depositary.

18. The method of claim 17, further comprising:
logging historical records of the encryption key acquisition request.

19. The method of claim 15, further comprising:
performing on behalf of said depositary a process using said encryption key in response to a processing request from said depositary.

20. The method of claim 19, further comprising:

logging historical records of the processing request from said depositary.

21. The method of claim 15, further comprising:

supplying said historical records to the user to whom said encryption key is assigned.

22. The computer storage medium of claim 12, the executable software code further comprising:

instructions for decrypting the acquired encrypted recovery information using a private key of said server; and instructions for recovering said encryption key using the decrypted acquired recovery information.

23. The computer storage medium of claim 12, the executable software code further comprising:

instructions for logging historical records of the recovery request.

24. The computer storage medium of claim 22, the executable software code further comprising:

instructions for encrypting said recovered encryption key using said public key of said depositary in response to an encryption key acquisition request from said depositary; and instructions for sending said encrypted recovered encryption key to said depositary.

25. The computer storage medium of claim 24, the executable software code further comprising:

instructions for logging historical records of the encryption key acquisition request.

26. The computer storage medium of claim 22, the executable software code further comprising:

instructions for performing on behalf of said depositary a process using said encryption key in response to, a processing request from said depositary.

27. The computer storage medium of claim 26, the executable software code further comprising:

instructions for logging historical records of the processing request from said depositary.

28. The computer storage medium of claim 23, the executable software code further comprising:

instructions for supplying said historical records to the user to whom said encryption key is assigned.

* * * * *